United States Patent [19]
Ver Steeg

[11] 3,710,861
[45] Jan. 16, 1973

[54] MISCIBLE-TYPE FLOODING OF OIL RESERVOIRS HAVING WATER SATURATED BOTTOM ZONES

[75] Inventor: David J. Ver Steeg, Littleton, Colo.

[73] Assignee: Marathon Oil Company, Findlay, Ohio

[22] Filed: May 26, 1971

[21] Appl. No.: 147,257

[52] U.S. Cl. ................................. 166/269, 166/273
[51] Int. Cl. ............................................. E21b 43/22
[58] Field of Search ..................... 166/269, 273, 274

[56] References Cited

UNITED STATES PATENTS

| | | |
|---|---|---|
| 3,221,810 | 12/1965 | Marx ................................. 166/269 |
| 3,289,758 | 12/1966 | Martin ............................. 166/273 X |
| 3,366,175 | 1/1968 | Ferrell et al. ..................... 166/269 X |
| 3,369,601 | 2/1968 | Bond et al. ....................... 166/269 X |
| 3,406,754 | 10/1968 | Gogarty .............................. 166/273 |
| 3,443,636 | 5/1969 | Gogarty ........................... 166/273 X |
| 3,467,191 | 9/1969 | Van Daalen et al. ................ 166/269 |
| 3,507,331 | 4/1970 | Jones .................................. 166/273 |
| 3,565,175 | 2/1971 | Wilson ............................... 166/269 |
| 3,605,892 | 9/1971 | Gogarty et al. ..................... 166/273 |

*Primary Examiner*—Stephen J. Novosad
*Attorney*—Joseph C. Herring, Richard C. Willson, Jr. and Jack L. Hummel

[57] ABSTRACT

Production of crude oil from an oil-bearing subterranean reservoir having a water zone in fluid communication with and directly below an oil zone is realized by simultaneously injecting about 1–20 percent formation pore volume micellar dispersion in the oil zone and about 0.01–5 percent formation pore volume micellar dispersion in the water zone, followed by a mobility buffer comprising an aqueous polymer solution and drive medium in both zones.

12 Claims, No Drawings

3,710,861

MISCIBLE-TYPE FLOODING OF OIL RESERVOIRS HAVING WATER SATURATED BOTTOM ZONES

BACKGROUND OF THE INVENTION

1. Field of the Invention

This invention relates to the secondary and tertiary recovery of oil with micellar dispersion flooding. It is specifically related to the recovery of oil from reservoirs having a "wet bottom", i.e. a predominantly-water zone underlying an oil zone.

2. Description of the Prior Art

It is known that secondary and tertiary recovery of oil can be effected by injecting an aqueous flooding medium into a subterranean oil-bearing formation and displacing it toward a production well.

U. S. Pat. No. 2,827,964 to Sandiford and U. S. Pat. No. 3,039,529 to McKennon teach secondary recovery processes in which a viscous aqueous solution of water-soluble partially hydrolyzed acrylamide polymer is injected into an injection well and forced through the formation toward a production well.

Secondary and tertiary recovery of oil via micellar dispersion flooding is also not a new concept.

U. S. Pat. No. 3,254,714 to Gogarty et al. teaches the use of a microemulsion containing hydrocarbon, surfactant and water in the recovery of crude oil.

U. S. Pat. No. 3,497,006 to Jones et al. discloses secondary and tertiary recovery processes which utilize an oil-external micellar dispersion containing up to about 90 percent water. About 1-20 percent formation pore volume is required in their process.

U. S. Pat. No. 3,506,070 to Jones discloses a water-external micellar dispersion comprised of water, hydrocarbon and surfactant useful in the recovery of crude oil.

None of these methods, in themselves, are feasible in reservoirs having a water zone in fluid communication with and directly below an oil zone. The polymer flooding methods are not capable of recovering sufficient crude oil, since the flooding medium is attracted to the more permeable water zone. Economic considerations prohibit flooding the entire reservoir with a micellar dispersion.

SUMMARY OF THE INVENTION

Applicant has discovered that excellent oil recoveries are realized from oil-bearing subterranean reservoirs having water zones in fluid communication with and directly below oil zones by simultaneously injecting about 1 to about 20 percent, preferably about 2 to about 7 percent, and more preferably about 3.5 to about 6 percent formation pore volume of a micellar dispersion followed by a mobility buffer and a drive medium into the oil zone; and injecting about 0.01 to about 5 percent, preferably about 0.1 to about 2 percent, and more preferably about 0.4 to about 1.2 percent formation pore volume of a micellar dispersion followed by a mobility buffer and a drive medium into the water zone. Essentially both zones are flooded with micellar dispersions, but there is a substantial difference in the relative amounts. The relatively small amount of micellar dispersion used in the water zone facilitates the recovery of oil which is driven from the oil zone into the water zone during the flooding process.

DESCRIPTION OF THE INVENTION

The term "micellar dispersion" as used herein is meant to include micellar solutions and microemulsions. Micellar dispersions are composed of hydrocarbon, aqueous medium (e.g., water, brackish water and brine water), surfactant, and optionally cosurfactant and/or electrolyte. Examples of volume amounts include about 2 to about 90 percent hydrocarbon, about 5 to about 95 percent aqueous medium, at least about 4 percent surfactant, about 0.01 to about 20 percent cosurfactant and about 0.001 to about 5 percent by weight electrolyte. In addition, the micellar dispersion and/or subsequent slugs can contain corrosion inhibiting agents, bactericides, etc. Examples of useful hydrocarbon, surfactant, aqueous medium, cosurfactant, and electrolyte include those found in U. S. Pat. Nos. 3,254,714, 3,497,006 and 3,506,070.

Preferred polymers which can be used in conjunction with this invention, as mobility buffers, include high molecular weight polyelectrolytes, specifically high molecular weight polyacrylamides and partially hydrolyzed products thereof, sulfonated high molecular weight polymers, chemically modified polymers such as CMC (carboxymethylcellulose), polysaccharides, and like polymers. Essentially any polymer which is water soluble, compatible within the reservoir and possessive of mobility reducing characteristics can be used.

The invention is preferably carried out by placing casing in the injection means to a subsurface level of at least the interface of the oil zone and the water zone, and preferably below this level; perforating the casing; running pipe inside the casing to the level of the interface of the oil zone and the water zone, thereby forming an annulus; sealing the annulus at the interface of the oil zone and water zone, preferably by placing packing at this junction; and injecting the specified materials into the oil zone and the water zone to drive the oil and the water towards the production means.

A mobility buffer is injected following the micellar dispersion to obtain improved flooding characteristics, e.g. inhibits fingering of subsequently injected drive water into the micellar dispersion and/or crude oil. From about 5 to about 75 percent formation pore volume is useful, depending upon the particular reservoir characteristics. Preferably, the mobility of the mobility buffer is about equal to or less than that of the tail end of the micellar dispersion.

Following the mobility buffer, sufficient drive medium, e.g. water, is injected to displace the micellar dispersion and mobility buffer toward a production well in fluid communication with the subterranean reservoir to recover crude oil.

EXAMPLE 1

A fired Berea core slab 1 inch by 60 inches is fitted with steel plates at each end. The injection end has two injection ports, with a metal dividing plate protruding into the rock approximately 1 ½ inches. This metal plate divides the injection end into two equal halves and is welded perpendicular to the end face plate containing the injection ports. The entire production end is open to the rock face. The end plates and the rock surface are coated with epoxy paint to allow flooding of the core slab. One pore volume of water is initially injected into the core slab. Water is then injected in the bottom injection port simultaneously with and at ten times the rate crude oil (10 cp. at ambient temperature) is injected in the top port, to achieve a water saturated bottom zone. (This relative rate is determined by the viscosity ratio.) 2.5 percent formation pore volume micellar dispersion, consisting of 1.78 percent Pyronate 50 (a sodium petroleum sulfonate, average molecular weight 350, sold by Sonneborn Chemical Co.), 1.7 percent Petronate HL (a sodium petroleum sulfonate, average molecular weight 422, sold by Sonneborn Chemical Co.), 9.3 percent of an ammonium petroleum sulfonate having an average molecular weight 440, 47.4 percent water containing about 18,000 ppm T. D. S., 2.3 percent primary amyl alcohol, and 37.5 percent crude oil having a viscosity of about 7 cp. at ambient temperature, is injected into the oil zone of the core. Simultaneously about 0.5 percent formation pore volume of a micellar dispersion of the same composition as above is injected into the water zone. A mobility buffer consisting of Dow Pusher 700 polymer (a partially hydrolyzed polyacrylamide, Pusher is a trademark of Dow Chemical Co., Midland, Michigan.) is injected immediately following the micellar dispersions in the top and bottom zones. Water is then injected as the drive medium to displace the mobility buffer toward the production end of the core. The results show that 69.8 percent of the oil in the core is recovered.

EXAMPLE II

The process of Example I is repeated, the only variation being the simultaneous injection of 3 percent formation pore volume micellar dispersion in the oil zone and a 1 percent formation pore volume micellar dispersion in the water zone. The results show a 90.0 percent oil recovery.

EXAMPLE III

The process of Example I is again repeated using 4% formation pore volume micellar dispersion in the oil zone and 1 percent formation pore volume micellar dispersion in the water zone. This yields a 94.5 percent oil recovery.

It should be understood that the invention is capable of a variety of modifications and variations which will be made apparent to those skilled in the art by a reading of the specification and which are to be included within the spirit of the claims appended hereto.

What is claimed is:

1. A process for recovering crude oil from an oil-bearing subterranean reservoir having a water zone in fluid communication with and directly below an oil zone and having at least one injection means in fluid communication with at least one production means, the process comprising injecting about 1 to about 20 percent formation pore volume micellar dispersion into the oil zone, and simultaneously injecting about 0.01 to about 5 percent formation pore volume micellar dispersion into the water zone, and injecting into both the oil zone and the water zone immediately following the respective micellar dispersions a mobility buffer followed by sufficient drive medium to displace the micellar dispersions toward the production means to recover crude oil therethrough.

2. The process of claim 1 wherein the micellar dispersion is oil-external.

3. The process of claim 1 wherein the micellar dispersion is water-external.

4. The process of claim 1 wherein the drive medium is water.

5. The process of claim 1 wherein the mobility buffer comprises a partially hydrolyzed, high molecular weight polyacrylamide.

6. A process for recovering crude oil from an oil-bearing subterranean reservoir having a water zone in fluid communication with and directly below an oil zone and having at least one injection means in fluid communication with at least one production means, the process comprising:
 a. placing casing in the injection means,
 b. perforating the casing,
 c. running pipe inside the casing to at least the level of the interface of the oil zone and the water zone, thereby forming an annulus,
 d. sealing the annulus at the interface of the oil zone and the water zone,
 e. injecting about 1 to about 20 percent formation pore volume micellar dispersion into the oil zone through the annulus, and simultaneously
 f. injecting about 0.01 to about 5 percent formation pore volume micellar dispersion into the water zone through the pipe,
 g. injecting into both the oil zone and the water zone immediately following the respective micellar dispersions a mobility buffer followed by a drive medium, thereby producing a mixture of oil and water through the production means.

7. The process of claim 6 wherein the micellar dispersion is oil-external.

8. The process of claim 6 wherein the micellar dispersion is water-external.

9. The process of claim 6 wherein the drive medium is water.

10. The process of claim 6 wherein the aqueous polymer solution is a partially hydrolyzed polyacrylamide.

11. The process of claim 6 wherein the annulus is sealed by means of a packer.

12. The process of claim 6 wherein the casing extends to at least the interface of the oil zone and the water zone.

* * * * *